United States Patent [19]
Buck et al.

[11] Patent Number: 5,307,998
[45] Date of Patent: May 3, 1994

[54] METHOD FOR PROCESSING SCRAP FILM

[75] Inventors: Ray A. Buck, Picture Rocks; Kimber Smith; Larry J. Wilson, both of Muncy, all of Pa.

[73] Assignee: Andritz Sprout-Bauer, Inc., Muncy, Pa.

[21] Appl. No.: 939,052

[22] Filed: Sep. 2, 1992

Related U.S. Application Data

[62] Division of Ser. No. 746,357, Aug. 16, 1991, Pat. No. 5,170,949.

[51] Int. Cl.$^5$ .................. B02C 23/26; B02C 23/30
[52] U.S. Cl. .......................... 241/3; 241/19; 241/24; 55/210; 406/19; 406/168
[58] Field of Search .............. 241/3, 101.4, 19, 24, 241/35, 48, 60, 62; 406/19, 151, 168, 192, 109; 55/210, 319, 434

[56] References Cited

U.S. PATENT DOCUMENTS

| | | |
|---|---|---|
| 1,631,927 | 6/1927 | Dietrich . |
| 2,427,903 | 9/1947 | Crites . |
| 2,499,359 | 3/1950 | Cox, Jr. . |
| 2,724,618 | 11/1955 | Bearer . |
| 3,110,208 | 11/1963 | Mitchell, Jr. et al. . |
| 3,393,016 | 7/1968 | Van Doorn et al. . |
| 3,460,228 | 8/1969 | Turner . |
| 4,004,738 | 1/1977 | Hawkins ........................... 241/29 |
| 4,393,644 | 7/1983 | Martenas . |
| 4,632,321 | 12/1986 | Danler . |
| 4,657,192 | 4/1987 | Browning . |
| 4,664,317 | 5/1987 | Morton . |
| 4,732,512 | 3/1988 | Welch . |
| 4,832,537 | 5/1989 | Roberts et al. . |
| 4,861,200 | 8/1989 | Lubbenhusen et al. . |
| 4,932,594 | 6/1990 | Kim . |

Primary Examiner—Mark Rosenbaum
Assistant Examiner—Frances Chen
Attorney, Agent, or Firm—Chilton, Alix & Van Kirk

[57] ABSTRACT

An economical apparatus and method for reprocessing scrap film. The apparatus includes a film-air separation chamber for separating air from incoming strips of scrap film, a cutter for cutting the strips into fine pieces, and a storage tank or further reprocessing means to which the cut pieces of scrap film are conveyed. A air bypass line having a computer-controlled valve conveys air directly from the film-air separation chamber to the cutter outlet when the valve is in an open position, and causes all of the air to flow into the cutter inlet when the valve is in a closed position. The open or closed position of the air bypass valve depends upon the cutter motor power, which varies as the volume of scrap film in the cutter varies. Due to the inclusion of the accurately controlled air bypass valve, only a single fan is needed to convey the film into and out of both the film-air separation chamber and the cutter.

15 Claims, 1 Drawing Sheet

METHOD FOR PROCESSING SCRAP FILM

This is a divisional of copending application Ser. No. 746,357 filed Aug. 16, 1991 now U.S. Pat. No. 4,170,949.

BACKGROUND OF THE INVENTION

The present invention generally relates to scrap film, including plastic and paper, and more particularly relates to an economical apparatus and method for recycling scrap film.

In conventional processes for producing thin, continuous sheets of film, the edges of the sheets are cut off by a film slitter in order to form rolls of product having a constant width. The edge trim is often recycled and used to produce new sheets of film.

Reprocessing of film scrap can take place on the site of film production or at a remote location. For economic reasons, scrap film recycling most commonly takes place at the location of film production. In on-site recycle processing, the edge trim that is slit from the sheets of film product is immediately conveyed to a cutter which chops the trim into small pieces in preparation for further processing.

A conventional apparatus for conveying the scrap film to and from the cutter includes one fan upstream from the cutter for blowing the film into the cutter, and another fan downstream from the cutter for removing the cut particles. Furthermore, a cyclone is located upstream from the cutter between the fan and the cutter. Thus, in order for the strips of trim to be fed into and the cut particles drawn out of the cutter, the conventional system must include the costs for the acquisition, maintenance, and energy usage of two fans and a cyclone.

SUMMARY OF THE INVENTION

An object of the invention is to provide an economical apparatus and method for reprocessing scrap film, including plastic and paper film Another object of the invention is to provide an apparatus and method for recycling scrap film which requires less equipment than a conventional apparatus and method.

Other objects will be in part obvious and in part pointed out more in detail hereinafter.

The invention in a preferred form is an apparatus and method for processing scrap film, including plastic and paper film, in which a single fan is used to convey the scrap material to and from a scrap film cutter. The apparatus includes an air system into which long, narrow strips of edge trim or strips are fed. The film strips are conveyed into a film-air separator and onward to a motor driven film cutter. The power of the cutter motor varies automatically based upon the amount of film in the cutter. The film is cut into pieces in the cutter and is then conveyed from the outlet of the film cutter to a storage bin, or, alternatively, onward to further reprocessing means. The fan which conveys the material in and out of the cutter is positioned downstream from the cutter.

An air bypass line directly connects the air system to the outlet end of the film cutter. The air bypass line has a control valve in order to control the flow rate of air therethrough. The position of the control valve is modulated commensurate with fluctuations in the power of the cutter motor. More specifically, changes in the cutter motor power are sensed by a sensor which is linked to a control means for controlling the position of the control valve. When the cutter motor power is low, i.e., during start-up and when the film cutter is relatively empty, the control valve is open in order to draw additional film into the film cutter. When the cutter motor power is high, i.e., when the film cutter is relatively full of finely cut particles, the control valve is closed in order to draw film out of the film cutter. During steady-state operation, the control valve preferably is closed. Because the automatic operation of the control valve provides for accurate control of the rate of air flow through the cutter, only a single fan is needed in order to convey the edge trim into the air system and out of the film cutter.

The invention accordingly comprises the apparatus and method possessing the features, properties, and the relation of elements, which are exemplified in the following detailed disclosure, and the scope of the application which will be indicated in the claims.

BRIEF DESCRIPTION OF THE PREFERRED EMBODIMENT

Figure 1:
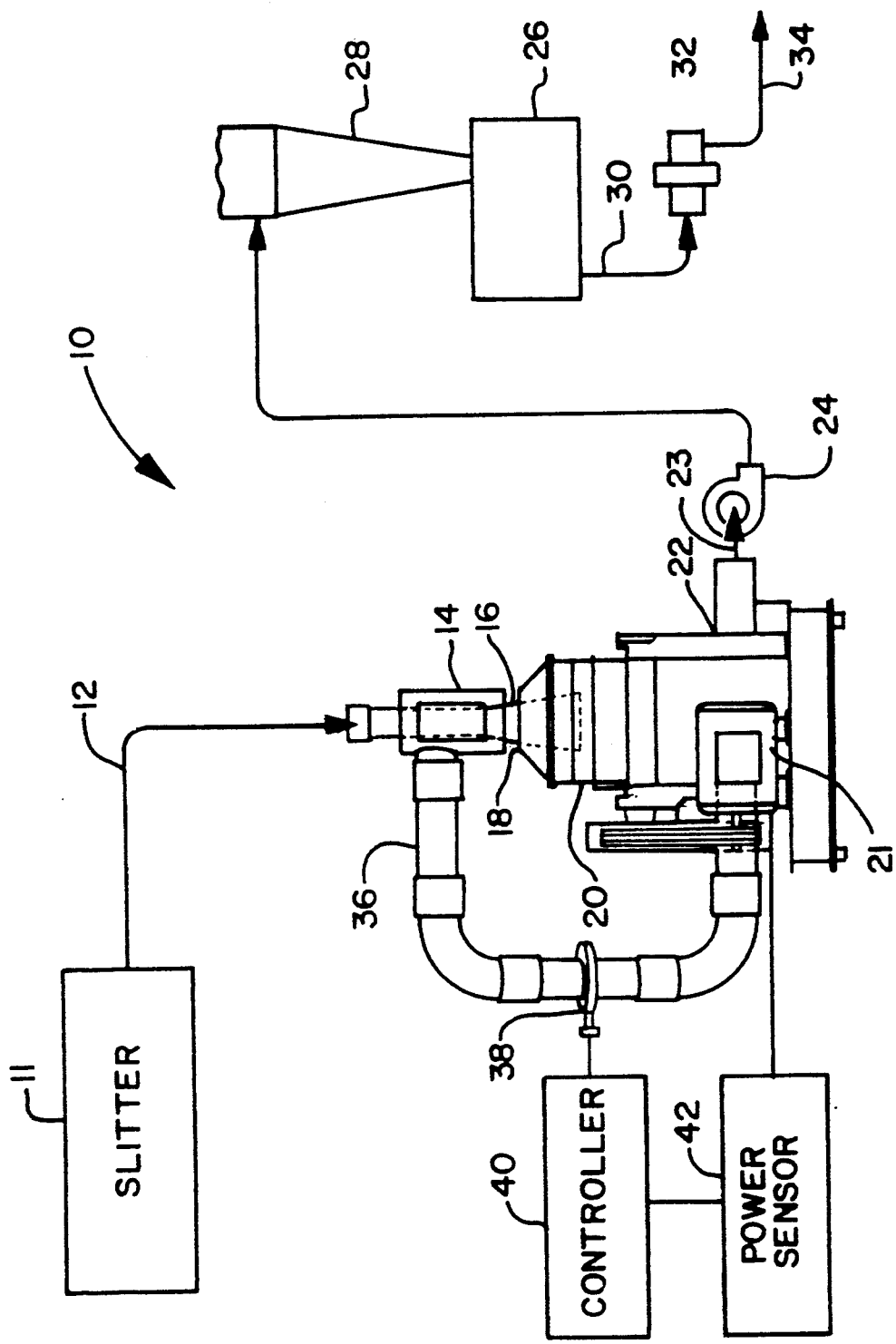
FIG. 1 is a schematic view including the film conveying apparatus of the invention, which can be used to practice the process of the invention.

Referring now to FIG. 1 in detail wherein like numerals represent the same or like parts throughout, a scrap film processing apparatus is designated generally by the numeral 10. The apparatus 10 includes a scrap film inlet line 12 to which scrap film is fed directly after it is cut from the edges of sheets of film product (not shown) by edge slitter 11. The inlet line 12 can be made of any suitable material, such as metal tubing and can be of any diameter suitable for conveying the scrap film.

The scrap film inlet line 12 directs scrap film to the film-air separator 14. The separator 14 has a film outlet opening 16 at the lower end thereof, which feeds a film-air mixture into an inlet opening 18 of a scrap film cutter 20, where the scrap film is chopped to a fine particle size. The scrap film cutter 20 is powered by a motor 21 having a fixed horsepower capacity up to about 300 hp. The current drawn by the motor increases inherently as the volume of scrap film in the scrap film cutter 20 increases, and the current decreases as the volume of scrap film in the scrap film cutter 20 decreases. The finely chopped film exits the scrap film cutter 20 at the cutter outlet end 22 along a tubular cutter outlet line or discharge conduit 23, and is conveyed to a fluff bin 26 through a cyclone 28 above the bin 26. The fluff bin 26 stores the finely cut scrap film, and provides for even discharge of the cut scrap film through the bin discharge line 30 and into the pelletizer 32, where the film is formed into pellets. Capsulated film pellets are released into a pellet outlet line 34, the pellets being suitable for use in making new plastic products after further conventional processing.

A fan 24 is positioned between the scrap film cutter 20 and the fluff bin 26. The fan 24 conveys the scrap film away from the edge slitter 11, along the scrap film inlet line 12, through the film-air separation chamber 14, through the scrap film cutter 20, and along the cutter outlet line 23 to the cyclone 28. The cyclone 28 is arranged to feed the fluff bin 26 by gravity. A second fan is not needed upstream from the scrap film cutter 20 to convey the scrap film through the first stage of the process, i.e., from the edge slitter 11 to the cutter 20, as the fan 24 downstream from the scrap film cutter 20 is able to pull scrap film into the scrap film cutter 20. The separator 14 is of conventional construction, including means for preventing the entry of film into the air bypass line 36.

The single fan 24 is sufficient to convey the scrap film from the edge slitter 11 through the scrap film processing apparatus 10 to the cyclone 28 due to the accurate control of the air flow rate through the scrap film cutter 20. The flow rate of air through the scrap film cutter 20 is continually and automatically adjustable due to the inclusion of an air bypass line 36 which extends directly from the film-air separation chamber 14 to the outlet end 22 of the scrap film cutter 20. The air bypass line 36 has a control valve 38 which is moveable between an open position and a closed position. While in the preferred embodiment, the valve alternates between two positions, i.e., fully open and fully closed, it is possible to have a control valve which additionally can be modulated to a variety of partially open and partially closed positions.

The open or closed position of the control valve 3 is regulated by a valve controller 40. The valve controller 40 alternately opens and closes the valve depending upon the power output of the motor 21, which is sensed by the solid state motor power sensor 42. When the motor 21 is operating near its maximum power capacity, the control valve 38 is closed, in order to pull air directly to the cutter outlet end 22, and therefore pull scrap film out of the scrap film cutter 20 along cutter outlet line 23 to prevent the scrap film cutter 20 from becoming clogged. When the motor 21 is operating at a lower power, the valve 38 is open in order to convey additional film into the scrap film cutter 20. Whether the bypass valve is opened or closed, the motive force by which the scrap film is transferred is the same, i.e., a pressure differential across the apparatus 10 which cause the air and scrap film to move toward the fluff bin 26. During start-up, the control valve 38 is repeatedly opened and closed. During steady-state operation, the control valve 38 preferably remains closed.

The valve controller 40 is computerized, and can be programmed to alternate between opened and closed positions at various levels of motor power. Preferably, the valve controller 40 is set to open the valve 38, or maintain an open position, when the motor power is below a particular level, for example, 20 hp, and to close the valve 38, or maintain a closed position, when the motor power is above 20 hp, or another predetermined power level. The motor power changes automatically depending upon the volume of film in the scrap film cutter 20.

EXAMPLE

Narrow strips of polyethylene (or other type of plastic) film scrap trimmed from a roll of film product by a conventional slitter were conveyed through a 5 inch pipe at a rate of 5000 feet per minute through a film-air separator and into a film cutter model DSF 1512 from Andritz Sprout-Bauer, Inc. having a 30 horsepower motor, and outward from the cutter to a fluff bin. The strips of film scrap were conveyed from the slitter to the fluff bin by a single fan located downstream from the cutter and upstream from the fluff bin. During start-up, when the power of the cutter exceeded about 18 hp, the control valve on the air bypass line was closed, resulting in an air flow rate of about 800 cubic ft/min. from the top of the separator to the cutter outlet. This air flow pulled the film out of the cutter through the cutter outlet, and onward to the fluff bin. The motor power was sensed by monitoring each of the three power phases with a voltmeter and the amperage of one leg was monitored in order to determine horsepower. The valve controller was a combination of commercially available components commonly used to monitor electrical power and energizes an air operated valve.

The cost and energy consumption of the single fan were about half of the cost and energy consumption of two fans used in the conventional system.

As will be apparent to persons skilled in the art, various modifications and adaptations of the apparatus and method described above can be made without departure from the spirit of the invention, the scope of which is defined in the appended claims.

What is claimed is:

1. A method of processing scrap film, comprising:
   conveying the scrap film to a film-air separation means using a first conveying means,
   conveying the scrap film from the film-air separation means to a cutting means using the first conveying means, the cutting means having an inlet end, an outlet end disposed upstream from the first conveying means, and a motor, the motor having a power output varying with changes in volume of scrap film in the cutting means, and
   conveying the cut scrap film through a discharge conduit using the first conveying means, and
   controlling the rate of flow of scrap film through the film-air separation means, the cutting means, and the discharge conduit by properly positioning, at one of an open and a closed position, an air bypass valve on an air bypass line directly connecting the film-air separation means and the outlet end of the cutting means.

2. A method according to claim 1, wherein the controlling step includes moving the air bypass valve between an open position and a closed position, the position of the air bypass valve modulating commensurate with changes in the motor power of the cutting means.

3. A method according to claim 1, wherein the controlling step comprises opening the air bypass valve when the motor power of the cutting means is low, and closing the air bypass valve when the motor power of the cutting means is high.

4. A method according to claim 1, further comprising the step of sensing the power output of the cutting means and producing an output signal indicative thereof.

5. A method according to claim 4, wherein the controlling step includes moving the air bypass valve between an open position and a closed position, the position of the air bypass valve modulating commensurate with changes in the motor power of the cutting means.

6. A method according to claim 4, wherein the controlling step comprises opening the air bypass valve when the motor power of the cutting means is low, and closing the air bypass valve when the motor power of the cutting means is high.

7. A method of processing scrap film, comprising:
   conveying the scrap film to a film-air separation means using a first conveying means,
   conveying the scrap film from the film-air separation means to a cutting means using the first conveying means, the cutting means having an inlet end, an outlet end, and a motor, the motor having a power output varying with changes in volume of scrap film in the cutting means, conveying the cut scrap film through a discharge conduit using the first conveying means, and controlling the rate of flow of scrap film through the film-air separation means, the cutting means, and the discharge conduit by properly positioning, at one of an open and a closed position, an air bypass valve on an air bypass line directly connecting the film-air separation means and the outlet end of the cutting means, wherein the first conveying means comprises no more than one fan.

8. A method according to claim 7, wherein the controlling step includes moving the air bypass valve between an open position and a closed position, the position of the air bypass valve modulating commensurate with changes in the motor power of the cutting means.

9. A method according to claim 7, wherein the controlling step comprises opening the air bypass valve when the motor power of the cutting means is low, and closing the air bypass valve when the motor power of the cutting means is high.

10. A method of processing scrap film, comprising:

conveying the scrap film to a film-air separation means using a first conveying means having no more than one fan, conveying the separated scrap film from the film-air separation means to a cutting means using the first conveying means, the cutting means having an inlet end, an outlet end, and a motor, the motor having a power output varying with changes in volume of scrap film in the cutting means, sensing the power output of the cutting means and producing an output signal indicative thereof, conveying the cut scrap film through a discharge conduit using the first conveying means, and controlling the rates of flow of scrap film through the film-air separation means, the cutting means, and the discharge conduit by properly positioning, at one of an open and a closed position, an air bypass valve on an air bypass line directly connecting the film-air separation means and the outlet end of the cutting means, the position of the air bypass valve being controlled by the output signal from the cutting means.

11. A method according to claim 10, wherein the controlling step includes opening the air bypass valve when the power output of the motor is low and closing the air bypass valve when the power output of the motor is high.

12. A method of reducing the energy consumption of a pneumatic conveying means in a scrap film recycling system having film-air separation means connected to film cutting means, the film cutting means having an inlet end, an outlet end, and a motor-driven cutter including a motor having a motor power which varies according to the volume of film in the film cutting means, comprising the steps of:

providing air bypass means for conveying air directly from the air separation means to the outlet end of the film cutting means, the air bypass means having a control valve, the open or closed position of the control valve varying with fluctuations in the motor power of the cutter, the valve being open when the motor power of the cutter is low and closed when the motor power of the cutter is high, and providing no more than one fan to convey the scrap film into and out of both of the air separation means and the film cutting means.

13. A method of reducing the energy consumption of a pneumatic conveying means in a scrap film recycling system having film-air separation means fluidly connected to film cutting means, the film cutting means having an inlet end, an outlet end, a motor-driven cutter including a motor having a power output which varies according to the volume of film in the film cutting means, and sensor means for sensing the power output of the motor and providing an output signal indicative thereof, the method comprising the steps of:

providing an air bypass means for conveying air directly from the air separation means to the outlet end of the film cutting means, the air bypass means having a control valve including control means for operating the control valve in response to the output signal from the sensor means, the control valve being open when the motor power of the cutting means is low and closed when the motor power of the cutting means is high, and providing no more than one fan to convey the scrap film into and out of both the air separation means and the film cutting means.

14. A method of reducing the energy consumption of a pneumatic conveying means in a scrap film recycling system having film-air separation means connected to film cutting means, the film cutting means having an inlet end fluidly connected to the film-air separation means, an outlet end, and a motor-driven cutter including a motor having a motor power which varies according to the volume of film in the film cutting means, the method comprising the steps of:

providing air bypass means for conveying air directly from the air separation means to the outlet end of the film cutting means, the air bypass means having a control valve, the open or closed position of the control valve varying with fluctuations in the motor power of the cutter, the control valve being open when the motor power of the cutter is low and closed when the motor power of the cutting means is high, and providing a first conveying means downstream from the film cutting means to convey the scrap film into and out of both the air separation means and the film cutting means.

15. A method according to claim 14, wherein the first conveying means consists of a single fan.

* * * * *